May 13, 1941.  N. P. SJOBRING  2,241,965
GRIP FOR HAND TOOLS
Filed Feb. 1, 1939
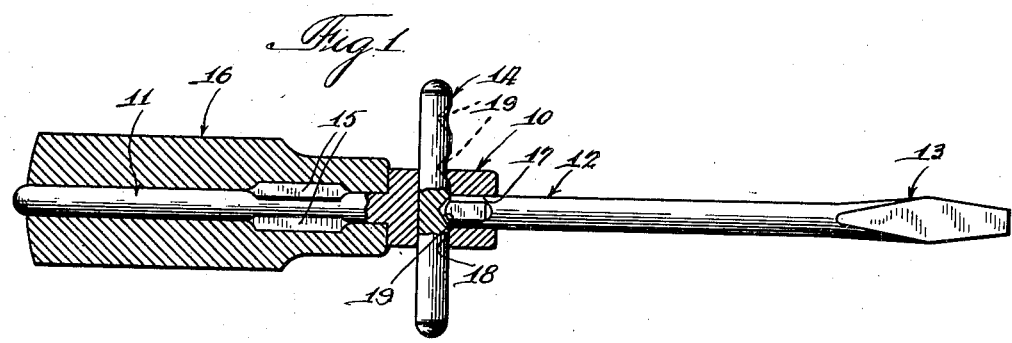
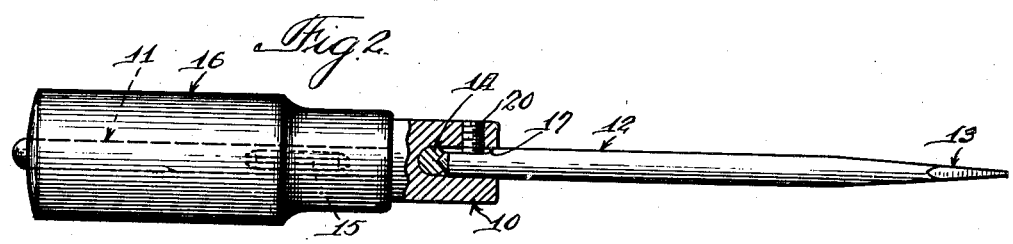
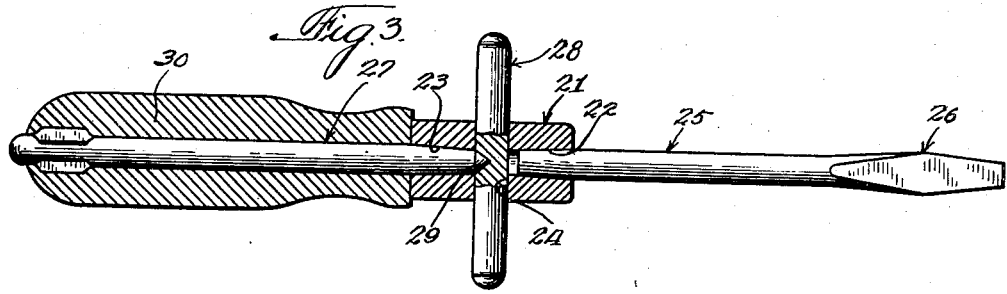
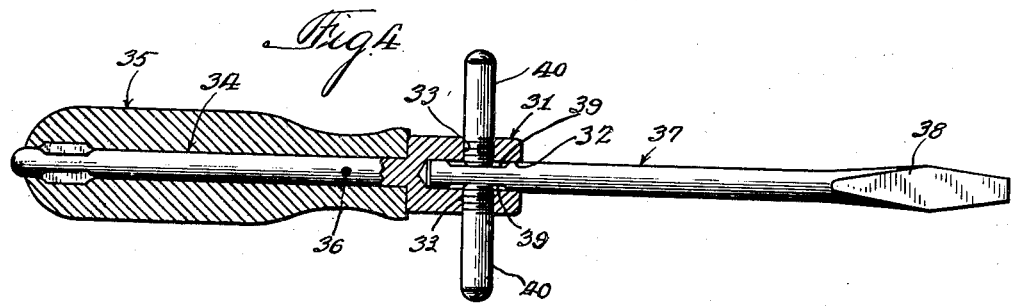
Inventor.
Nils P. Sjobring.

Patented May 13, 1941

2,241,965

UNITED STATES PATENT OFFICE 2,241,965

GRIP FOR HAND TOOLS

Nils P. Sjobring, Chicago, Ill.

Application February 1, 1939, Serial No. 253,953

2 Claims. (Cl. 145—65)

This invention relates to a grip for hand tools and has special reference to a handle element for engaging the blade of a screw driver or the like, the element having means thereon for effecting an interlocking engagement of certain parts of the element and blade and for augmenting the normal purchase of the hand in operating the engaged member.

More particularly, this invention relates to a grip for hand tools comprising a hub with a spindle member having a hand grip supported thereon and extending outwardly from one end of the hub and a shank member of the blade of a screw driver or the like extending outwardly from the other end of the hub, a finger piece engaging an aperture of the hub and extending transversely of the members for interlocking engagement with at least one of the members.

The blade of a screw driver, auger, or the like, is ordinarily provided with a hand grip of enlarged cross section having preferably a roughened surface in order that the hand, in manually operating the tool, may obtain a firm hold in rotating the blade. In some instances of use such a grip is effective, although in driving a screw or cutting a hole into a close-grained piece of wood or in releasing a rusty screw from the head of a rusty nut or in many like instances such a purchase on the hand grip is not sufficiently effective owing to the fact that the hand grip must fit in the palm of an average hand, and thus the diameter of the hand grip is relatively small even though enlarged relatively to the diameter of the blade. The smaller the diameter of the hand grip, the less leverage may be obtained in effecting a rotation thereof.

The present invention has for one of its objects the provision of a finger piece extending transversely of the longitudinal axis of the tool outwardly therefrom to a substantial distance beyond the diameter of the hand grip. The grip of the hand on the handle is thereby augmented by a finger grip on the outwardly extending finger pieces to obtain a greater leverage in a rotary movement of the tool. Thus, the added leverage effected by the use of the finger piece, together with the usual grip on the hand grip, makes it comparatively easier to drive or release a screw or to drill a hole or the like.

In some instances it may be desirable to remove the finger piece such, for example, as where the space is very limited, and further it may be desirable to have the blade of the tool replaceable against breakage or interchangeable with other blades forming separate tools. It is, therefore, another object of this invention to provide a grip for hand tools in which the finger piece or the blade or both may be interchangeable or replaceable with other finger pieces or other tools. In order to effect such an interchangeability or replaceablity of the parts, the parts being removable, it is necessary to effect an interlocking engagement thereof, and the invention, therefore, contemplates such an interlocking engagement, one member securing the other.

One of the objects of this invention is to provide a grip for hand tools of the character indicated above which is comparatively inexpensive to manufacture, is simple and efficient in operation, and is durable.

Another object of this invention is to provide a grip for hand tools of the type hereinabove mentioned in which the members thereof have interlocking engagement so that each individual member may be replaced by like members or may be interchangeable with other members.

A still further object of this invention is to provide a grip for hand tools of the type noted above wherein the normal grip on the hand grip of the tool is augmented by the grip on a finger piece providing relatively greater leverage.

Other objects and advantages of this invention will hereinafter be more particularly pointed out and, for a more complete understanding of the characteristic features of this invention, reference may now be had to the following description when taken together with the accompanying drawing, in which latter:

Figure 1 is a central sectional view partially in elevation of a grip for a hand tool embodying the features of this invention;

Fig. 2 is a side elevational view of Fig. 1 showing a fragmentary portion thereof in section;

Fig. 3 is a view similar to Fig. 1 of a modified form of construction embodying the features of this invention; and Fig. 4 is likewise a view similar to Fig. 1 showing a still further modified form of construction embodying the features of this invention.

Referring now to the drawing and more particularly to Figs. 1 and 2 thereof, the construction of this invention is embodied in a screw driver comprising a handle element having a hub 10 and a spindle member 11 extending outwardly from one end thereof with a hand grip 16 fixed to and supported by the spindle member. A shank member 12 of the blade 13 of a screw driver extends outwardly from the other end of the hub, and a finger piece 14 engages the hub and extends transversely of the spindle and shank members 11 and 13, respectively.

The hub 10 is preferably formed of a metal rod of cylindrical or polygonal shape with the spindle 11 of reduced diameter, shown as being formed integrally therewith on one end thereof. The spindle 11 may, of course, be a separate piece and fixed to the hub in any desired manner, although for convenience of disclosure the spindle is shown as being an integral part of the hub. Intermediate the ends of the spindle 11, fins 15 are upset from the material of the spindle to provide means for the prevention of rotation of the hand grip 16 thereon. The handle element, including the hub 10 and hand grip 16, may of course be formed integrally of wood, plastic composition, metal or the like, whereby the spindle member 11 may or may not be essential. Where reference is made to a handle element, it is meant to include the hub 10 hand grip 16 and spindle member 11 or the equivalent thereof in an integral whole.

The hand grip 16 may be formed of wood or a molded composition or the like. If formed of wood the spindle 11 is driven into an aperture extending axially throughout the length of the handle with the fins cutting their own grooves in the handle, or if molded the spindle needs necessarily only be set in the mold with the material of the handle formed thereabout. Of course, if the spindle 11 is of polygonal or non-circular contour when viewed in cross section the fins 15 are not necessary.

An end opening 17 is provided in the hub 10 communicating with a transverse opening 18 therein. The end of the shank 12 of the blade 13 of the screw driver is inserted in the end opening 17 and the finger piece 14 is extended into the transverse opening to any desired degree and, as shown in the drawing, the finger piece extends the same distance on each side of the hub. A plurality of depressions 19 are disposed on the peripheral surface of the finger piece 14, the end of the shank having a seating engagement in any one of the depressions.

If it is desired to have a maximum amount of leverage the end of the shank 12 may be seated in the outermost depression 19 so that the finger piece extends a very substantial distance on one side of the hub 10. If it is more desirable to have a leverage on both sides of the axis of the blade, then the finger piece may extend an equal distance on opposite sides of the hub with the end of the shank 12 seated in the depression 19 intermediate the ends of the piece as shown in the drawing. The length of the finger piece need only be limited by the amount of leverage required and the space available for operation.

When the shank 12 of the blade 13 is in its seated position with respect to the finger piece 14, the finger piece and shank have an interlocking relation preventing the finger piece from displacement from the transverse opening. The blade may have a drive fit in the end opening 17 or, as is shown in the drawing, may be held in position in the aperture by a set screw 20 resting against a flattened portion on the end of the shank 12.

Referring now more particularly to Fig. 3 of the drawing, the construction therein shown comprises a handle element for engaging a blade of a screw driver. A hub 21 is provided with end openings 22 and 23 on opposite ends thereof communicating with a transverse opening 24. The hub 21 may preferably comprise a metal cylinder and the end openings 22 and 23 are shown as being tapered therein. A tapered end of a shank 25 extending from a blade 26 of a screw driver has a drive fit in the opening 22 and the tapered end of a spindle 27 likewise has a drive fit in the opening 23 of the hub 21.

A finger piece 28 extends through the transverse aperture 24 and is held in position therein by means of an extension of the spindle 27 seating in a depression 29 of the finger piece. This construction may be desirable where it is not necessary to remove the elements forming the construction for purposes of replacement or the like. A hand grip 30 of wood, composition material, or the like, is supported on the spindle 27 in a fixed relation therewith.

Referring now more particularly to Fig. 4 of the drawing, the construction therein shown comprises a handle element for engaging the blade of a screw driver. A hub 31, preferably formed of a metal cylinder, is provided with an end opening 32 and a communicating transverse opening 33. A spindle 34 extends from and is fixed to the other end of the hub 31, the spindle being of reduced cross section relative to the hub for supporting in a fixed relation therewith a hand grip 35. The hand grip 35 may be of wood, composition material, or the like, and is prevented from rotation on the spindle by means of a pin 36.

The shank 37 of the blade 38 of the screw driver engages the end opening 32, a recessed portion 39 being provided on opposite sides of the shank in alignment with the transverse opening 33 when the shank is in position therein. The transverse opening 33 is threaded to threadedly engage the externally threaded portions of finger pieces 40, the finger pieces extending to seat in the recesses or depressions 39 of the shank 37. The finger pieces, threadedly engaging the hub 31, are prevented from displacement therefrom by reason of such engagement and the finger pieces in turn seat in the recesses 39 of the shank 37 to prevent displacement of the shank from the hub and also prevent relative rotation therebetween.

While several embodiment of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. A grip for hand tools comprising a hub having an aperture extending transversely therethrough and a communicating axial aperture, a spindle member fixed to and extending outwardly from one end of said hub, a hand grip fixed to and supported by said spindle member, a shank member of the blade of a screw driver or the like engaging said axial aperture in the other end of said hub and extending outwardly therefrom, and a one-part finger piece extending through said transverse aperture of said hub outwardly on both sides thereof, said finger piece having means for interlocking engagement with said shank member for fixing said finger piece with respect to said hub.

2. A grip for hand tools comprising a hub, a spindle member fixed to and extending outwardly from one end of said hub, a hand grip fixed to and supported by said spindle member, a shank member of the blade of a screw driver or the like engaging an aperture in the other end of said hub, and a finger piece for engagement with an aperture of said hub and extending transversely of said members, said finger piece having a depression in which the end of said shank member is seated for fixing said finger piece with respect to said hub.

NILS P. SJOBRING.